(12) United States Patent
Mortensen et al.

(10) Patent No.: US 10,508,656 B2
(45) Date of Patent: Dec. 17, 2019

(54) CIRCULATING PUMP UNIT AND SOLAR THERMAL PLANT

(71) Applicant: GRUNDFOS HOLDING A/S, Bjerringbro (DK)

(72) Inventors: Lars Sund Mortensen, Aars (DK); Kim Hulegaard Jensen, Rødkærsbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 379 days.

(21) Appl. No.: 14/892,727

(22) PCT Filed: Apr. 28, 2014

(86) PCT No.: PCT/EP2014/058595
§ 371 (c)(1),
(2) Date: Nov. 20, 2015

(87) PCT Pub. No.: WO2014/187647
PCT Pub. Date: Nov. 27, 2014

(65) Prior Publication Data
US 2016/0169239 A1    Jun. 16, 2016

(30) Foreign Application Priority Data
May 21, 2013  (EP) .................................... 13168535

(51) Int. Cl.
*F04D 27/00*    (2006.01)
*F24S 50/40*    (2018.01)
(Continued)

(52) U.S. Cl.
CPC ....... *F04D 27/006* (2013.01); *F04D 15/0066* (2013.01); *F04D 27/007* (2013.01); *F24S 50/40* (2018.05); *F24D 17/0068* (2013.01)

(58) Field of Classification Search
CPC ............................... F04D 27/007; F24J 2/402
See application file for complete search history.

(56) References Cited

U.S. PATENT DOCUMENTS 4,062,349 A * 12/1977 Birnbreier ............. F24D 11/003
126/587
5,206,819 A *  4/1993 Illing .................. F24D 19/1042
126/561
(Continued)

FOREIGN PATENT DOCUMENTS

DE       41 12 758 A1   10/1992
DE      197 05 008 A1    8/1998
(Continued)

*Primary Examiner* — Kenneth Rinehart
*Assistant Examiner* — Deepak A Deean
(74) *Attorney, Agent, or Firm* — McGlew and Tuttle, P.C.

(57) ABSTRACT

A circulation pump assembly (2) includes an electric drive motor (6) and a control device (10) integrated into the circulation pump assembly (2). At least one internal temperature sensor (16) is arranged in the circulation pump assembly (2) and detects the temperature of the medium delivered by the circulation pump assembly (6) and issues a corresponding temperature signal (42) to the control device (10). The control device (10) is configured, on the basis of the temperature signal (42) of the internal temperature sensor (16), to approximately determine the temperature of the liquid in a liquid storage means (26) which is connected to the circulation pump assembly (2) via a heating circuit (28).

17 Claims, 3 Drawing Sheets

(51) Int. Cl.
*F04D 15/00* (2006.01)
*F24D 17/00* (2006.01)

(56) References Cited

U.S. PATENT DOCUMENTS

| | | | | |
|---|---|---|---|---|
| 8,920,130 | B2* | 12/2014 | Jensen | F04D 15/00 |
| | | | | 417/26 |
| 2010/0318227 | A1* | 12/2010 | Steinberg | F24F 11/006 |
| | | | | 700/278 |
| 2011/0135515 | A1* | 6/2011 | Jensen | F04D 15/00 |
| | | | | 417/410.1 |
| 2012/0024518 | A1* | 2/2012 | Jensen | F24D 3/105 |
| | | | | 165/287 |
| 2012/0027625 | A1* | 2/2012 | Milthers | F04B 49/02 |
| | | | | 417/63 |
| 2012/0183014 | A1 | 7/2012 | Larsen et al. | |
| 2012/0192965 | A1* | 8/2012 | Popper | E03B 7/04 |
| | | | | 137/357 |
| 2014/0321839 | A1* | 10/2014 | Armstrong | F24H 9/2021 |
| | | | | 392/463 |

FOREIGN PATENT DOCUMENTS

| | | |
|---|---|---|
| DE | 103 34 436 A1 | 3/2005 |
| DE | 10 2006 009047 A1 | 8/2007 |
| EP | 1 426 699 A1 | 6/2004 |
| RU | 2250422 C2 | 4/2005 |

* cited by examiner

CIRCULATING PUMP UNIT AND SOLAR THERMAL PLANT

CROSS REFERENCE TO RELATED APPLICATIONS

This application is a United States National Phase Application of International Application PCT/EP2014/058595 filed Apr. 28, 2014 and claims the benefit of priority under 35 U.S.C. § 119 of European Patent Application 13 168 535.6 filed May 21, 2013 the entire contents of which are incorporated herein by reference.

FIELD OF THE INVENTION

The invention relates to a circulation pump assembly as well as to a solar-thermal installation with such a circulation pump assembly.

BACKGROUND OF THE INVENTION

Solar-thermal installations comprise at least one solar collector and a water storage means, in which for example service water to be heated is stored. The solar collector is connected to a heat exchanger arranged in or on the water storage, via a heating circuit, in which a circulation pump delivering the heating medium heated by the solar collector into the heat exchanger of the water storage means and back out of this into the solar collector is arranged. It is known to control this circulation pump with regard to its speed, in dependence on the heat demand in the water storage means and on the heat quantity provided in the solar collector. For this, the known installations comprise at least two temperature sensors, one on the solar collector and one in the water storage means. These two temperature sensors are to be connected to a control device which as the case may be, can be integrated into the circulation pump. Such connections of the sensors are prone to error with regard to assembly and in operation.

SUMMARY OF THE INVENTION

It is therefore an object of the invention, to improve the construction of a solar-thermal installation, to the extent that the installation is simplified and the proneness to error during operation is reduced.

The circulation pump assembly according to the invention comprises an electric drive motor and preferably a control device for the control or regulation (closed-loop control) of this electric drive motor. In particular, the control device is configured in a manner such that it can control or regulate the (rotation) speed of the electrical drive motor. The electrical drive motor in the known manner drives at least one impeller of a centrifugal pump. The centrifugal pump preferably in the known manner with the electrical drive motor forms a construction unit in the form of a circulation pump assembly.

According to the invention, the circulation pump assembly comprises at least one internal temperature sensor. This internal temperature sensor is arranged in the circulation pump assembly such that it detects the temperature of the medium delivered by the circulation pump assembly. For this, the temperature sensor is preferably arranged on or in the flow path for the medium to be delivered or the liquid to be delivered, in the inside of a pump housing of the circulation pump assembly. The temperature sensor can thereby be arranged such that it comes into direct contact with the medium to be delivered, but can for example however also be connected in a thermally conductive manner to a wall defining the flow path through the pump housing. This particularly lends itself if the pump housing which defines the flow paths is formed from metal. The temperature sensor is configured such that it issues a temperature signal corresponding to the temperature of the medium delivered by the circulation pump assembly, to the control device. This permits the control device to control and/or regulate the drive motor, in particular to regulate it with regard to the speed, on the basis of the detected temperature signal of the at least one internal temperature sensor. Thereby, yet further parameters, for example signals of further sensors can flow into the control or regulation.

Furthermore, the control device is integrated into the circulation pump assembly. Thus the electrical and electronic components forming the control device are preferably integrated into an electronics housing or a terminal box, which is arranged on the electrical drive motor of the circulation pump assembly. Thus, the circulation pump assembly can form an integrated construction unit which encompasses all components which are necessary for the operation of the circulation pump assembly, specifically the electric drive motor, the actual pump or centrifugal pump and the electrical or electronic components which form the control device for the control or regulation of the drive motor.

According to the invention, the control device is configured in a manner such that it approximately determines the temperature of the liquid in a liquid storage means connected to the circulation pump assembly via a heating circuit, on the basis of the temperature signal of the internal temperature sensor. This design has the advantage that one can make do without a temperature sensor on or in the liquid storage means itself. Instead, the temperature in the liquid storage means which is necessary e.g. for the control of the solar-thermal installation, is indirectly determined via the internal temperature sensor of the circulation pump assembly. The construction of such a solar-thermal installation is simplified by way of this, since one can make do without an external temperature sensor and its connection to the control device. Due to this measure, on the one hand the setting up of the installation is simplified, and on the other hand the reliability on operation of the installation is increased.

Preferably, the control device comprises a communication interface which is configured for the communication with at least one external device, in particular with a sensor, actuator and/or at least one external control. The pump assembly can for example communicate with a superordinate (higher-level) control, further subordinate pump assemblies, actuators such as valves for example or further external sensors, or receive signals of such devices, via this communication interface.

Particularly preferably, the communication interface is configured for communication with at least one external temperature sensor. This in particular is an external temperature sensor which is provided for arrangement in or on a solar collector for detecting the fluid temperature in the solar collector.

The control device is further preferably configured in a manner such that it regulates or controls the electrical drive motor in its speed, in dependence on the temperature signal from the internal temperature sensor and a temperature signal from the at least one external temperature sensor. Thus, the control device can control the pump assembly such that for example a desired flow is set in dependence on the detected temperature signals. Thereby, for example an external temperature sensor can detect the temperature at a heat source such as a solar collector, and the internal temperature sensor the temperature of the medium to be heated, in particular water to be heated. The drive motor can then be controlled or regulated such that it sets a required flow which is necessary e.g. for heating service water via a heat exchanger.

The communication interface of the control device can be configured as a wired-connected electrical communication interface, but for example can also be configured as an optical communication interface. Particularly preferably, the communication interface is configured as a wireless interface and in particular as a radio interface. By way of this, the installation effort is minimised, in particular on connection to components lying further away, since one can forgo a complicated wiring. The associated external components or devices which are to communicate with the communication interface of the control device, then usefully comprise correspondingly configured communication interfaces, i.e. as the case may be wire-connected or wireless interfaces. Particularly preferably, these devices also comprise radio interfaces. Thus, for example an external temperature sensor can be provided with a corresponding interface, in particular radio interface which in this manner can communicate with the control device via its communication interface. Thereby, at least one unidirectional communication from the sensor to the control device is provided. As the case may be, a bidirectional communication can be provided for example for coupling the external device to the control device. Such a bidirectional communication moreover lends itself if the external device is an actuator for example, such as a valve to be controlled.

According to a further preferred embodiment of the invention, the communication interface of the control device is configured for the automatic coupling to a communication interface of the at least one external device. Such a design is particularly advantageous if both parts, i.e. the control device and the external device are connected to one another for example via a network system or bus system, in which yet further components or devices are integrated. The control device and the external device then for example can preferably automatically recognize each other and automatically couple for communication, in such a network, for example a data network. Moreover, this design lends itself if the communication interfaces are configured as radio interfaces. Thus, the installation is simplified since both apparatus, when they have been put into operation, communicate with one another via corresponding signals such that they automatically recognize one another and couple automatically for communication with one another. Thus, for example an external temperature sensor can automatically locate and couple to the communication interface of the control device, in a manner such that the control device uses the temperature signal of this coupled external temperature sensor for the control or regulation. Such a coupling is indeed essential if several sensors or control devices are in reach, since then a fixed assignment is necessary, in order to be able to avoid any malfunctioning.

Further preferably, the communication interface of the control device is configured in a manner such that it automatically effects a coupling to a communication interface of an external device which is suitable for coupling, inasmuch as this external device is not yet coupled to another pump assembly or its control device. In this manner, with the automatic coupling, one prevents an external device, for example a temperature sensor being mistakenly coupled to the control devices of two pump assemblies. Thus, the assignment of an external device to exactly one control device can be ensured. Alternatively, it is however also conceivable, in complex systems, to couple an external device to two pump assemblies for communication, for example to make the signal of an external temperature sensor available to two pump assemblies or their control devices, if both pump assemblies are to be controlled or regulated on the basis of the same temperature signal from this external temperature sensor. Thus, for example one can make do without an external component, such as a temperature sensor, as the case may be.

Particularly preferably, the control device of the circulation pump assembly according to the invention is configured for the control of a solar-thermal installation with at least one liquid storage means and at least one solar collector for heating the liquid in the liquid storage means, wherein the circulation pump assembly is envisaged for installation into a heating circuit between the liquid storage means and the solar module. In such an installation, the control device of the circulation pump assembly can assume the complete control or regulation of the solar-thermal installation, i.e. in particular can control or regulate the drive motor of the circulation pump assembly such that the liquid in the liquid storage means is heated by the solar collector in the desired manner. Thus, one can make do without an external control device, and the installation of the complete installation is significantly simplified. The control device is preferably integrated into the circulation pump assembly, by which means the assembly is particularly simplified. The control device of the circulation pump assembly can communicate with further external devices, e.g. as the case may be, control or regulate further pump assemblies, activate valves and, as the case may be, acquire data from external sensors such as flow sensors and/or temperature sensors and take this into account with the control or regulation of the solar-thermal installation or control or regulate the installation on the basis of the incoming measurement values.

The circulation pump assembly is situated in the flow path of the heating medium, preferably at the exit side of a heat exchanger which is arranged on or in the liquid storage means, so that the temperature of the heating medium in the heating circuit and which exits from the heat exchanger of the liquid storage means, corresponds essentially to the temperature in the inside of the liquid storage means. If now the temperature of the heating medium is detected by the internal temperature sensor of the circulation pump assembly, then one can determine the temperature in the inside of the liquid storage means. As the case may be, the control device can hereby carry out corrections, for example on the basis of individual correction factors which are dependent on the installation. Thus, for example, the distance of the circulation pump assembly to the liquid storage means, on account of which a cooling of the heating medium between the liquid storage means and the circulation pump assembly can occur, can be taken into account with the control.

Particularly preferably, the control device is configured in a manner such that even with a standstill of the pump assembly, i.e. if no heating medium is delivered, it can at least approximately determine the temperature in the liquid storage means. For this, the control device is configured such that it determines the temperature of the fluid in the liquid storage means given a standstill of the circulation pump assembly, on the basis of the temperature which was last detected by the internal temperature sensor on operation of the circulation pump assembly. Thereby, the control device can be configured such that departing from the temperature value which was last determined on operation of the circulation pump assembly, it continues or extrapolates the temperature in the temporal course along a defined characteristic curve.

Further preferably, the control device is configured in a manner such that the evaluation of the temperature of the fluid in the liquid storage means is based on a predefined falling characteristic curve for the temporal course of the temperature, wherein the characteristic curve preferably runs in a linearly or exponentially dropping manner. Thereby, the control device in particular is configured such that it determines the temperature of the fluid in the liquid storage means on the basis of such a predefined characteristic curve, when the drive motor of the pump assembly is switched off, i.e. the circulation pump assembly is not in operation. In this condition, no heating medium is delivered from the liquid storage means to the circulation pump assembly, and the internal temperature sensor thus does not determine the current temperature of the heating medium exiting from the liquid storage means or its heat exchanger. Inasmuch as this is concerned, no current temperature of the liquid in the liquid storage means is detected in this condition. The mentioned evaluation of the temperature on the basis of a predefined characteristic curve is then effected departing from the last detected current temperature value on operation of the circulation pump assembly, i.e. with a running drive motor. Departing from this last temperature value which was detected on operation of the circulation pump assembly by the internal temperature sensor, the current temperature value of the liquid in the liquid storage means given a switched-off pump assembly is then estimated or extrapolated on the basis of the predefined characteristic curve.

The characteristic curve, in particular a dropping characteristic curve thereby takes into account a cooling of the liquid in the liquid storage means, if no feeding of heat is given. If the circulation pump assembly is not in operation, no heat supply from the solar collector is effected. The cooling thereby results on the one hand due to the heat losses of the liquid storage means, depending on its insulation. The type and quality of the insulation of the liquid storage means can thereby be taken into account in the characteristic curve. On the other hand, a cooling occurs for example when heated service water is taken from the liquid storage means and it is simultaneously topped up with cold service water. This could be taken into account by a flow sensor which detects the tapping of service water in the control, in order to estimate the current temperature more accurately. Alternatively, an average service water removal or tapping can be taken into account in the characteristic curve, on the basis of which the temperature is determined or estimated.

The invention, apart from the previously described circulation pump assembly, also comprises a solar-thermal installation with at least one solar collector, at least one liquid storage means and at least one circulation pump assembly which is arranged in a heating circuit between the solar collector and the liquid storage means and which is designed according to the preceding description. The control device of the circulation pump assembly, as previously described, can assume the control of the complete solar-thermal installation, in such a solar-thermal installation. The arrangement of the integrated temperature sensor in the circulation pump assembly thereby has the previously described advantage that the temperature in the liquid storage means can be determined via this internal temperature sensor at least approximately, so that a temperature value for the temperature of the liquid in the liquid storage means is known for the control or regulation of the solar-thermal installation, without arranging a temperature sensor directly on or in the liquid storage means. The construction of the complete solar-thermal installation is simplified by way of this, since it is not necessary to assemble a temperature sensor in or on the liquid storage means and to connect it to the control device for the communication. The installation of the installation is simplified by way of this, the danger of incorrect installations is avoided and moreover the operational reliability of the installation is increased.

Particularly preferably, at least one external temperature sensor is arranged on the solar collector and detects the temperature of a heating medium in the solar collector and comprises a communication interface, via which it is coupled to the communication interface of the control device of the circulation pump assembly in a manner such that the control device receives temperature signals from the external temperature sensor. Preferably, the communication interfaces are configured as radio interfaces. The one external temperature sensor is sufficient, in order to permit a control or regulation of the solar-thermal installation on the basis of the temperature in the solar collector and the temperature in the liquid storage means, due to the integration of the one temperature sensor into the circulation pump assembly. Thus, according to this embodiment, only an external temperature sensor needs to be connected or coupled to the control device. The other temperature sensor is integrated directly into the circulation pump assembly and there can be fixedly connected, in particular wired to the control device, in particular if this is likewise integrated into the circulation pump assembly.

The heating circuit, i.e. the heating circuit through the solar collector is preferably connected to the liquid storage means via a heat exchanger which is further preferably situated in the liquid storage means. Thus, the heat exchanger in the liquid storage means can be formed by a pipe conduit which is arranged in the inside of the liquid storage means and through which the heating medium flows. Service water to be heated can for example be located in the liquid storage means. Alternatively, the heat exchanger can also be arranged outside the liquid storage means. In this case, the liquid to be heated can be delivered in the liquid storage means through this external heat exchanger, for example by way of a further circulation pump.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
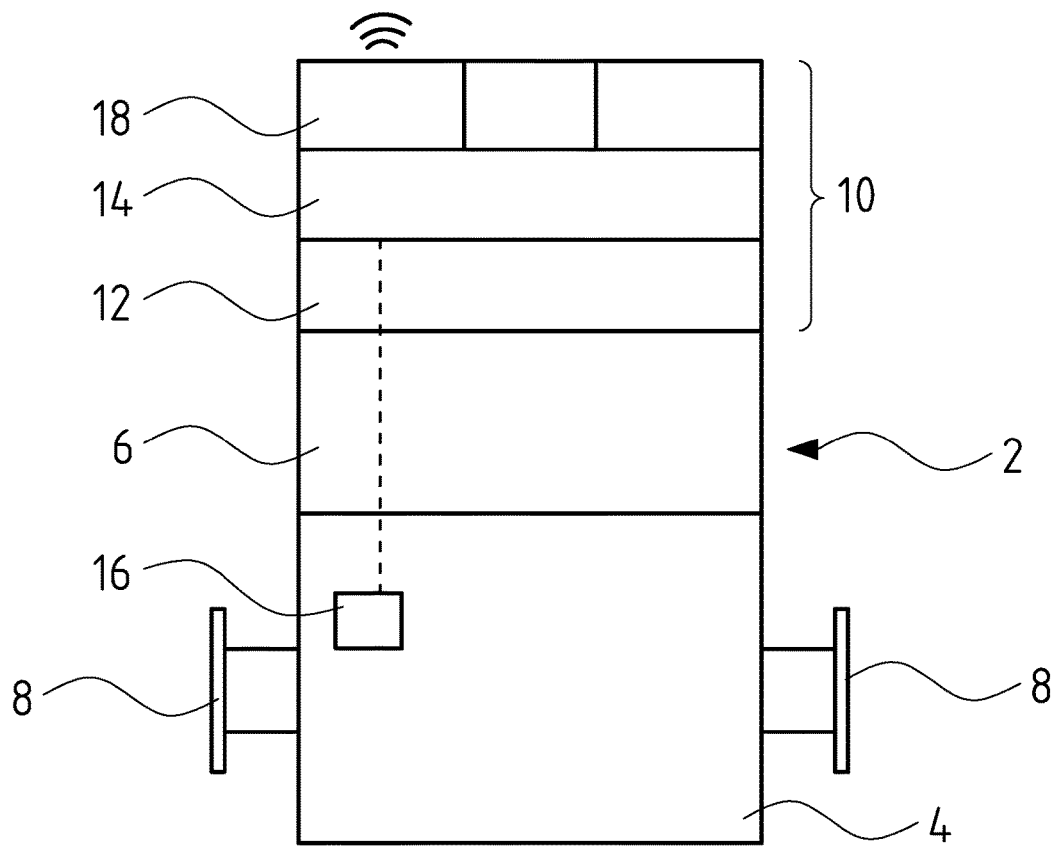
FIG. 1 is a schematic view of a circulation pump assembly according to the invention.

The circulation pump assembly 2 according to the invention, in the known manner comprises a pump housing 4 which contains an impeller of a centrifugal pump which is not shown here, and also comprises an electrical drive motor 6 which is connected to the pump housing 4 and which drives the at least one impeller in the pump housing 4. The pump housing comprises two connection nozzles (unions) 8, specifically an inlet nozzle and an outlet nozzle, for the connection to external pipe conduits.

The drive motor 6 in the known manner can be designed with a permanent magnet rotor and preferably as a canned motor.

A further constituent of the circulation pump assembly is a control device 10. The control device 10 is integrated into the pump assembly 2, for example in an electronics housing or terminal box, which is connected directly to the electrical drive motor 6 or together with this is arranged in an integrated housing. The control device 10 comprises a frequency converter 12, via which the speed of the drive motor 6 can be changed. I.e. the control device 10 can effect a speed control or a speed regulation of the drive motor 6. Moreover, the control device 10 comprises a control module 14 which can in particular be configured as a software module. The control module 14 controls the frequency converter 12, in order to set a desired speed of the electrical drive motor 6. Moreover, the control module 14 receives signals or data from sensors and these form the input signals necessary for the control or regulation.

Figure 2:
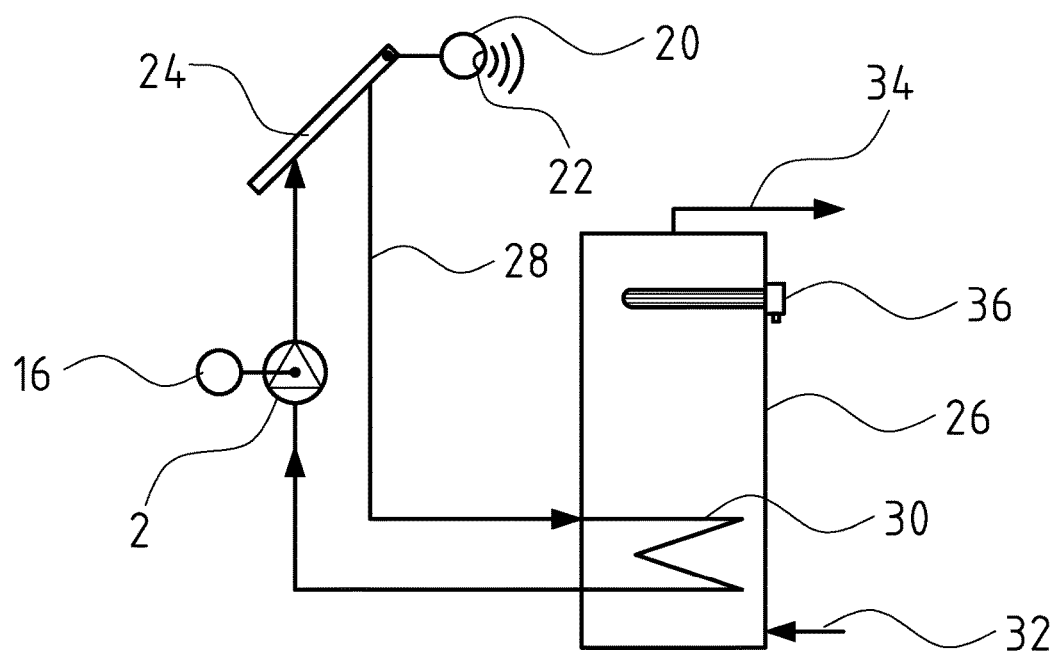
FIG. 2 is a schematic view of a solar-thermal installation according to the invention.

Thus, an internal temperature sensor 16 is arranged in the circulation pump assembly 2 in the pump housing 4, such that it detects the temperature of the medium which is delivered through the pump housing 4. This medium in particular is a heating medium such as e.g. water in a heating circuit, as is described hereinafter. The internal temperature sensor 16 issues a temperature signal which, as is indicated in FIG. 1 by the dashed line, is led to the control module 14 as an input variable, on which the control or regulation is based. Moreover, the control device 10 comprises a communication interface 18 which in this preferred example is configured as a radio interface. The communication interface 18 serves for the communication with an external temperature sensor 20 which is shown in FIG. 2. The external temperature sensor 20 comprises a corresponding communication interface 22 which is likewise configured as a radio interface and can send the temperature signals which correspond to the temperature detected by the external temperature sensor 20, to the communication interface 18 of the control device 10. Thus, the temperature signals from the external temperature sensors 20 are also processed by the control module 14 in this control device, and the drive motor 6 accordingly activated.

The communication interfaces 18 and 22 are preferably configured such that they permit an automatic coupling, i.e. assignment of the external temperature sensor 20 to the control device 10 or its control module 14. I.e. on switching on for the first time, the communication modules recognize each other and carry out a coupling procedure, so that subsequently the output signals of the external temperature sensor 20 can be reliably led to the control module 14.

FIG. 2 shows the arrangement of the circulation pump assembly 2 according to FIG. 1 in a solar-thermal installation. The solar-thermal installation comprises a solar collector 24 and a liquid storage means 26. The solar collector 24 is connected to the liquid storage means 26 via a heating circuit 28, wherein this solar collector can also be designed as an arrangement of several solar collectors. The circulation pump assembly 2 is arranged in this heating circuit 28, in order to deliver the heating medium through the solar collector 24 and a heat exchanger 30 in the inside of the liquid storage means 26. Thereby, the circulation pump assembly 2 is arranged at the exit side of the heat exchanger 30, i.e. of the liquid storage means 26, in the flow direction through the heating circuit 28. With this arrangement the temperature of the heating medium which exits from the heat exchanger 30 is essentially the same as the temperature of the liquid in the inside of the liquid container 26 in the region of the heat exchanger 30. This temperature, given a flow through the pump assembly 2, is detected by the internal temperature sensor 16 which is arranged there and is fed to the control device 10, i.e. the control module 14 as a temperature signal. The external temperature sensor 20 is arranged on or in the solar collector 24 such that there it detects the temperature of the heating medium. This temperature is transmitted as a temperature signal via the communication interface 22 to the communication interface 18 of the control device 10 and is thus likewise led to the control device 10 or its control module 14. The control device 10 via the frequency converter 12 controls or regulates the speed of the drive motor 6 and thus the flow of the circulation pump assembly 2, on the basis of these two detected temperature values. Thus, the complete control of the solar-thermal installation can be assumed by the control device 10 of the circulation pump assembly 2. The control device 10 in particular can switch the drive motor 6 on and off and control it with regard to the speed, in order to be able to set the flow in dependence on the heat requirement in the liquid storage means 26 and on the heat availability in the solar collector 24, in order to thus effect the necessary heat removal from the solar collector 24 and the necessary heat supply to the liquid storage means 26.

The liquid storage means 26 is for example a service water storage means with a feed 32 and an exit 34. Cold water service water which is to be heated is fed through the feed 32, and warm service water taken through the exit 34, which is effected for example by way of opening a tap. On opening a tap or a tapping location downstream of the exit 34, cold service water automatically flows through the feed 32 into the base region of the liquid container 26 and there is heated via the heat exchanger 30. In this example, an additional heating element 36 which for example is heated electrically or via an external heater boiler is arranged in the liquid storage means 26, in case the solar collector 24 does not provide sufficient heat for heating the fluid in the liquid storage means 26.

Figure 3:
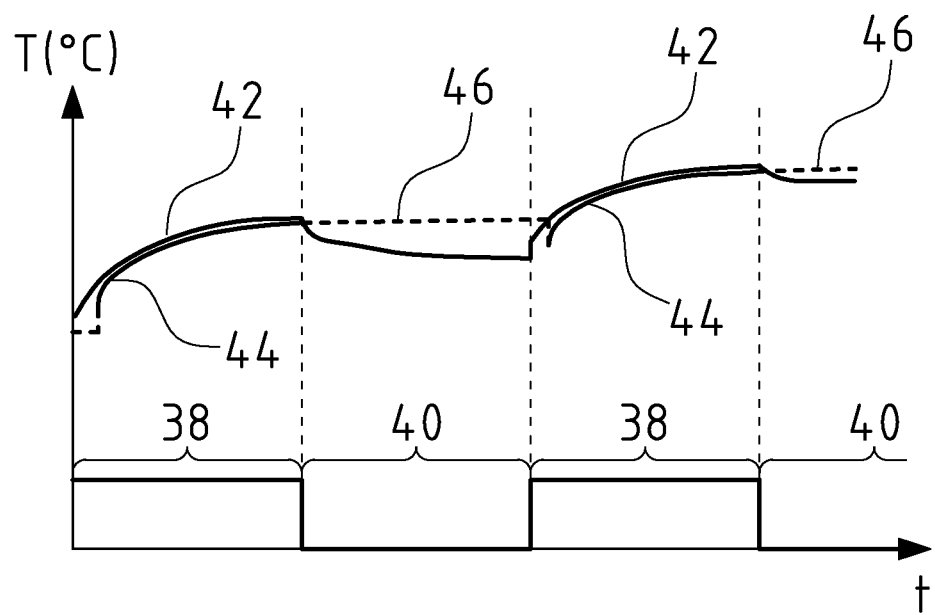
FIG. 3 is a graph of the temperature course in the liquid storage means.

FIG. 3 shows the temperature course T of the fluid in the liquid storage means 26 over time t. Thereby, the circulation pump assembly 2 is in operation in the time intervals 38, i.e. the drive motor 6 runs, whilst the circulation pump assembly 2, i.e. its drive motor 6 is switched off during the time intervals 40. The curve 42 in FIG. 3 shows the temperature course 42 in the inside of the liquid storage means 26. The temperature in the time interval 38 increases as long as the circulation pump assembly 2 is in operation. After switching off the circulation pump assembly 2, the temperature then slowly drops. This is caused by a heat loss at the liquid storage means 26 itself or by removal of service water via the exit 34, which causes a subsequent flow of cold water through the feed 32. The heat loss at the liquid storage means 26 is dependent on the type and quality of the insulation.

The internal temperature sensor 16 detects a temperature 44 which corresponds essentially to the actual temperature 42 in the liquid storage means 26, for as long as the circulation pump assembly delivers fluid in the heating circuit 28. The temperature 44 as the case may be will be slightly smaller than the temperature 42 at the same point in time, which is due to heat losses in the heat exchanger 30 as well as in the heating circuit 28 between the heat exchanger 30 and the circulation pump assembly 2. On switching on the drive motor 6, a certain delay is present, until the temperature sensor 16 detects a temperature 44 which corresponds essentially to the temperature 42 in the liquid storage means 26. This delay is dependent on the volume flow in the heating circuit 28 as well as the conduit length between the heat exchanger 30 and the circulation pump assembly 2.

On switching off the drive motor 6, no further heating medium is delivered from the heat exchanger 30 to the circulation pump assembly 2, so that the temperature sensor 16 no longer detects the current temperature in the liquid storage means 26. With the embodiment examples according to FIG. 3, the control module 14 is configured such that it continues the further control or regulation on the basis of an estimated temperature course 46, which is represented in a dashed manner in FIG. 3. With the embodiment example according to FIG. 3, the estimated temperature course 46 is a constant value which corresponds to the last detected temperature value 44 during the operation of the drive motor 6. Due to the fact that the temperature 42 in the liquid storage means 26 actually falls in the time intervals 40, in which the pump assembly 2 delivers no heating medium, as is represented in FIG. 3, a variance between the estimated temperature course 46 and the actual temperature course 42 occurs, by which means errors could result in the control or regulation of the complete installation.

Figure 4:
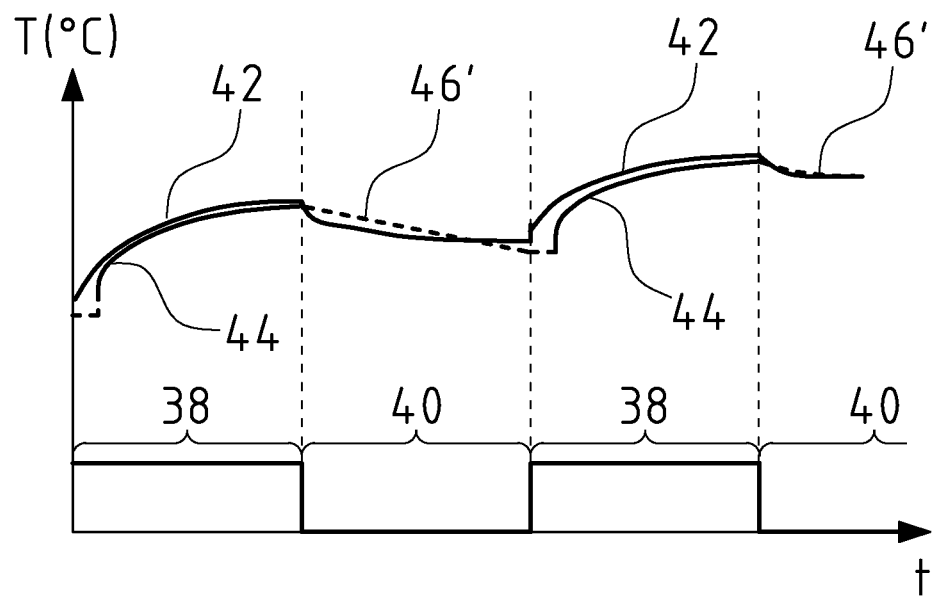
FIG. 4 is a graph of the temperature course in the liquid storage means with an optimized evaluation of the temperature by the control device.

FIG. 4 shows a variant, with which this error is reduced by way of the estimated temperature course 46' not having a constant value, but following a dropping characteristic curve 46'. This characteristic curve 46' can be stored in the control module 14 and as the case may be can be adapted, in order to adapt it to the actual design of the installation. In particular, the falling characteristic curve 46' can take into account the type of the insulation of the liquid storage means 26 and thus the occurring heat loss as well as the average cold water feed when tapping service water. Thus, the temperature value 46', given a switched-off drive motor 6, is extrapolated or estimated by the control device 10 or the control module 14 on the basis of the stored characteristic curve, departing from the last measured temperature value 44 on operation of the drive motor 8. In this manner, the temperature of the liquid in the liquid storage means 26 can be detected with the temperature sensor 16 in the circulation pump assembly 2 even without the arrangement of a temperature sensor in the liquid storage means 26, or, inasmuch as the circulation pump assembly 2 delivers no heating medium, can be estimated by the control device 10, wherein this estimation can be based on an adapted characteristic curve, in particular falling characteristic curve, which represents the expected temperature course over time departing from the last actually measured temperature value and which is stored previously in the control device 10.

While specific embodiments of the invention have been shown and described in detail to illustrate the application of the principles of the invention, it will be understood that the invention may be embodied otherwise without departing from such principles.

The invention claimed is:

1. A circulation pump assembly comprising:
   a circulation pump, a fluid storage being connected to the circulation pump assembly via a heating circuit;
   an electric drive motor;
   a control device integrated into the circulation pump assembly; and
   at least one internal temperature sensor arranged in the circulation pump assembly to detect a temperature of a medium delivered by the circulation pump assembly and issue a corresponding temperature signal to the control device, wherein the control device comprises one or more electronic components configured, on the basis of the temperature signal of the internal temperature sensor, to determine the approximate temperature of fluid in the fluid storage, wherein the control device is configured in a manner such that with a standstill of the electric drive motor, on the basis of a temperature signal which is issued previously by the internal temperature sensor on operation of the electric drive motor, in the further temporal course, the one or more electronic components being further configured to determine the approximate temperature of the fluid in the fluid storage connected to the circulation pump assembly via the heating circuit, wherein no temperature sensor is arranged in or on the fluid storage.

2. A circulation pump assembly according to claim 1, wherein the control device is configured for the control of the electric drive motor.

3. A circulation pump assembly according to claim 1, wherein the control device comprises a communication interface configured for communication with at least one external device comprising at least one of a sensor, an actuator and an external control.

4. A circulation pump assembly according to claim 3, wherein the communication interface is configured for communication with at least one external temperature sensor.

5. A circulation pump assembly according to claim 3, wherein the control device is configured in a manner such that the control device regulates the electric drive motor with regard to speed, in dependence on the temperature signal from the internal temperature sensor and on a temperature signal from the at least one external temperature sensor.

6. A circulation pump assembly according to claim 3, wherein the communication interface is configured as a wireless radio interface.

7. A circulation pump assembly according to claim 1, wherein the control device is configured for the control of a solar-thermal installation with at least the fluid storage and with at least one solar collector for heating the fluid in the fluid storage, wherein the circulation pump assembly is provided for installation into a heating circuit between the fluid storage and the solar collector.

8. A circulation pump assembly according to claim 1, wherein the control device is configured in a manner such that the determining of the temperature of the fluid in the fluid storage is based on a predefined falling characteristic curve for the temporal course of the temperature, wherein the characteristic curve runs in an essentially linearly or exponentially falling manner.

9. A circulation pump assembly according to claim 1, wherein the circulation pump assembly comprises a pump housing, the pump housing comprising a pump housing interior space, at least a portion of the at least one temperature sensor being arranged in the pump housing interior space, wherein a heat exchanger is arranged in an interior of the fluid storage, the circulation pump assembly receiving the medium from an outlet side of the heat exchanger, the temperature of the medium being associated with the temperature of the medium exiting the heat exchanger.

10. A solar-thermal installation comprising:
at least one solar collector;
at least one fluid storage, wherein no temperature sensor is arranged inside the at least one fluid storage or at the at least one fluid storage; and
a circulation pump assembly, said circulation pump assembly being arranged in a heating circuit between the solar collector and the fluid storage, said assembly comprising:
a circulation pump;
an electric drive motor;
a control device integrated into the circulation pump assembly; and
at least one internal temperature sensor arranged in the circulation pump assembly and detecting a temperature of a medium delivered by the circulation pump assembly and issuing a corresponding temperature signal to the control device, wherein the control device comprises one or more electronic components configured to determine the approximate temperature of fluid in the fluid storage on the basis of the temperature signal of the internal temperature sensor, wherein the one or more electronic components is further configured in a manner such that with a standstill of the electric drive motor, on the basis of a temperature signal which is issued previously by the internal temperature sensor on operation of the electric drive motor, in the further temporal course, the one or more electronic components is further configured to determine the approximate temperature of the fluid in the fluid storage connected to the circulation pump assembly via the heating circuit.

11. A solar-thermal installation according to claim 10, further comprising at least one external temperature sensor arranged on the solar collector wherein the control device comprises a communication interface and the at least one external temperature sensor detects the temperature of a heating medium in the solar collector and comprises a communication interface, via which the at least one external temperature sensor is coupled to the communication interface of the control device of the circulation pump assembly in a manner such that the control device receives temperature signals from the external temperature sensor.

12. A solar-thermal installation according to claim 10, wherein the heating circuit is connected to the fluid storage via a heat exchanger situated in the fluid storage, wherein no temperature sensor is arranged in or on the fluid storage, the circulation pump assembly comprising a pump housing, the pump housing comprising a pump housing interior space, at least a portion of the at least one temperature sensor being arranged in the pump housing interior space, the circulation pump assembly receiving the medium from an outlet side of the heat exchanger, the temperature of the medium being associated with the temperature of the medium exiting the heat exchanger.

13. A solar-thermal installation according to claim 11, wherein the control device is configured to control the electric drive motor.

14. A solar-thermal installation according to claim 13, wherein the control device is configured to regulate a speed of the electric drive motor in dependence on the temperature signal from the internal temperature sensor and on a temperature signal from the at least one external temperature sensor.

15. A solar-thermal installation according to claim 13, wherein the communication interfaces are configured as wireless radio interfaces.

16. A solar-thermal installation according to claim 10, wherein:
the control device is configured in a manner such that the determining of the temperature of the fluid in the liquid storage is based on a predefined falling characteristic curve for the temporal course of the temperature, wherein the characteristic curve runs essentially linearly or essentially in an exponentially falling manner.

17. A circulation pump assembly comprising:
a circulation pump, a fluid storage being connected to the circulation pump assembly via a heating circuit;
an electric drive motor;
a control module integrated into the circulation pump assembly; and
at least one internal temperature sensor arranged in the circulation pump assembly to detect a temperature of a medium delivered by the circulation pump assembly and issue a corresponding temperature signal to the control module, wherein the control module is configured, on the basis of the temperature signal of the internal temperature sensor, to at least determine the approximate temperature of fluid in the fluid storage, wherein no temperature sensor is arranged in or on the fluid storage.

* * * * *